3,513,384
ELECTROLYTIC CONDUCTIVITY CELL HAVING
UNPLATINIZED METAL ELECTRODES
Carl A. Schneider, 7229 Jethve Lane,
Cincinnati, Ohio 45243
Filed May 20, 1966, Ser. No. 551,737
Int. Cl. G01n 27/42
U.S. Cl. 324—30                                5 Claims

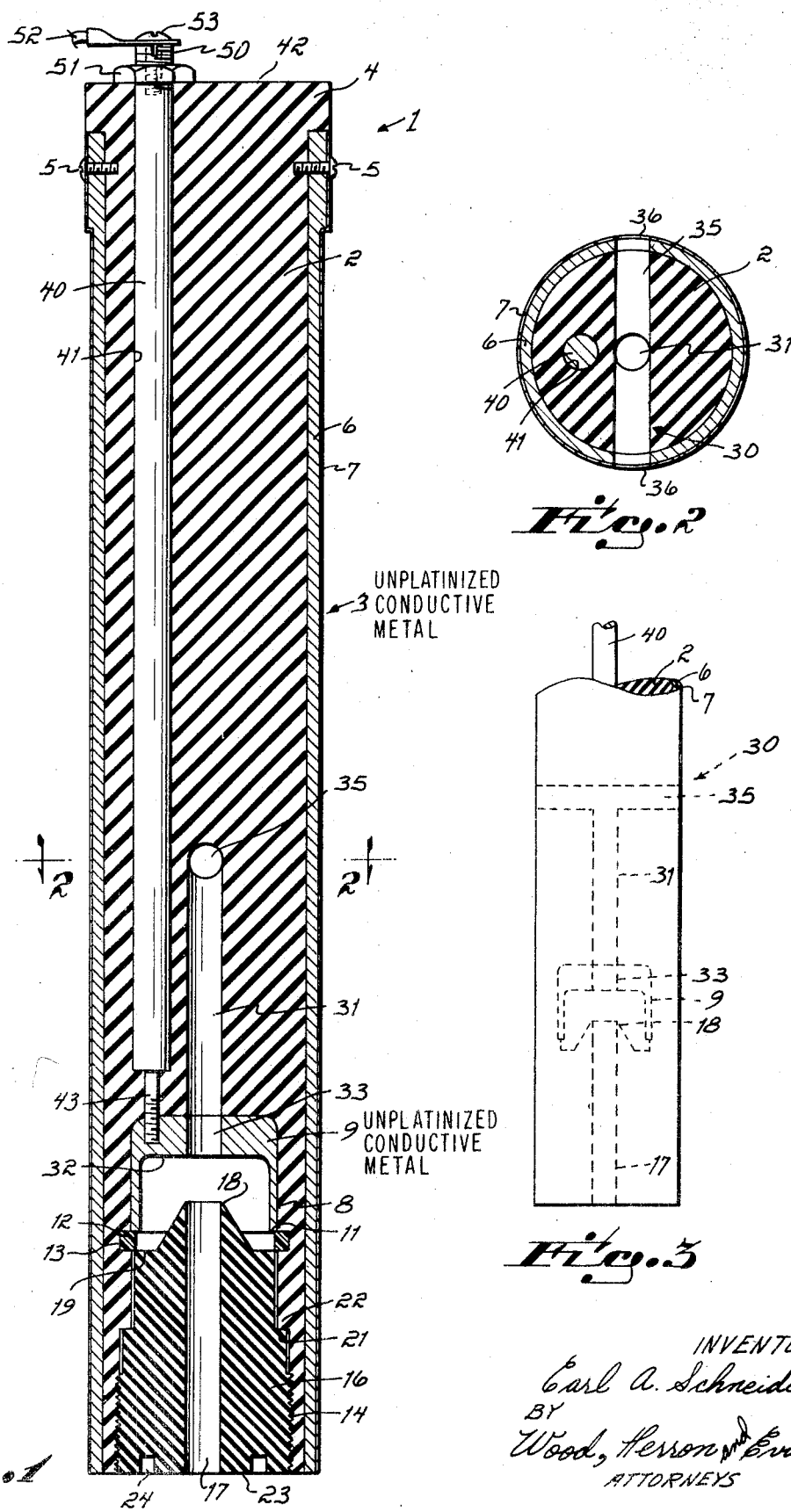

ABSTRACT OF THE DISCLOSURE

A conductivity cell particularly adapted for use in water monitoring systems of lakes, rivers and the like to measure various parameters of water such as chemical composition. The conductivity cell includes a nonconductive insulative body member, two electrodes carried by the body member in spaced relationship to one another and a conduit within said body for establishing a fluid contact path between the electrodes. The low side electrode shields the high voltage electrode from extraneous ground shunting effects. The conduit includes a primary section which has a cross-sectional area substantially smaller than the area of either of the electrodes and the section also has a length substantially greater than its diameter. The primary section terminates in spaced relationship from each of the electrodes whereby the resistance of a fluid within the primary section is substantially greater than the resistance of the fluid intermediate the ends of the section and the respective electrodes. This construction provides a cell wherein any changes in the electrode surfaces due to polarization, dirt accumulation or the like have no discernible effect on the measurement of conductivity.

---

This invention relates to conductimetric apparatus. More specifically, this invention relates to an electrolytic conductivity cell for measuring the conductivity of an aqueous solution of electrolytes.

The present conductivity cell is particularly adapted for use in water monitoring systems of the type employed to measure various parameters of water in lakes, rivers, bays and the like. One of the most important physical properties applicable to analysis of a body of water is the ability of the water as an aqueous solution of electrolytes to carry an electrical current. This property of electrolytic conductivity can be made to give significant and quantitative information about the chemical composition of the body of water being monitored, e.g., the amount of dissolved chlorides, nitrates, sulfates, phosphates and other ionizable materials.

In a conventional water monitoring unit, a stream of water is pumped through a conductivity cell and continuous electrical measurements are made of the water's conductivity. The results of these conductivity measurements are recorded locally or telemetered to a remote control recording station, or both. One such conductivity measuring system is disclosed in the copending application of Carl A. Schneider for Conductivity Measuring Circuit Utilizing Conductivity Cell as Input Resistance of an Operational Amplifier, Ser. No. 551,736, now U.S. Pat. 3,430,130, issued Feb. 25, 1969.

Many water monitoring units are located at remote and widely spaced points on a body of water. As a result, the units are operated under severe conditions in which they are checked and cleaned only at infrequent intervals which may be as long as several weeks or even months.

One of the principal objects of this invention is to provide a conductivity cell which can be utilized to accurately measure the conductivity of water samples under adverse conditions, such as exposure to salt water, over prolonged periods of time without need for frequent cleaning or recalibration. For example, one cell of the present invention was immersed in salt water, without cleaning, for a period of approximately ten months without any change in the cell constant.

Many forms of conductivity cells have previously been proposed, but basically all of these cells employ two metal plates, or electrodes, spaced within a chamber containing an aqueous solution of electrolytes whose conductivity is to be measured. On a laboratory scale, such a cell is simply constructed by inserting two electrodes into a beaker containing a solution of electrolytes and the electrodes are then connected to a source of electricity. A measurement is then made of the resistance of the column of water between the electrodes. In these and other prior art cells, the electrode area has been substantially equal to the cross-sectional area of the fluid column between the electrodes.

A number of more sophisticated conductivity cells have been proposed for laboratory usage. Typically, these types of cells are composed of tubular chambers constructed of highly insoluble glass or quartz in which electrode plates are welded at fixed distances. While these cells have a certain utility in the laboratory, they require far too much attention to be practical in a remotely located water monitoring system.

Other conductivity cells for industrial or field usage have been proposed to overcome the obvious deficiencies of the conventional laboratory sensors. Certain problems had to be overcome in order to achieve continuous, stable and accurate monitoring. One of the problems in monitoring electrolytic solutions is the phenomenon commonly referred to as "polarization." While this phenomenon is not completely understood, it is believed to occur when the charged ionic carriers have migrated through a dielectric, such as water, and become trapped or cannot discharge at an electrode to which they have migrated. Polarization at the electrodes of the cell can occur when the passage of current produces chemical reactions, or bubbling, at the electrodes of the cell. Polarization has the effect of modifying the solution under examination and altering its conductance by increasing the measured resistance. As a result, accuracy and stability of the conductivity cell deteriorate and the information obtained about the chemical composition of the aqueous solution is distorted and its value is greatly decreased.

It was recognized early that a conductivity cell cannot be operated with direct current since such currents produce chemical reactions which cause polarization and its unwanted effects. In theory, polarization, or electrolytic decomposition, can be reduced to the vanishing point by the the operation of the usual measuring circuit on alternating current. In practice, however, polarization of the cell electrodes still results.

It has become common practice to further inhibit polarization by coating the electrodes of the conductivity cell with platinum black. The platinum black is deposited on the electrode as a finely divided material, or spongy surface. Presently, conductivity cells manufactured in the industry are almost invariably constructed with platinized electrodes. Platinization of the conductivity cell electrodes, while reducing polarization, has still not proved to be a completely satisfactory solution to the problem. For, in practice, the electrodes must first be provided with the platinized surface which necessitates additional expense in producing the electrodes and maintaining the electrodes once produced. The platinized, spongy surface of the electrodes tends to collect electrolytic decomposition products or entrained particles, such as salts, oils, dirt and the like. Platinized electrodes, therefore, require cleaning after installation in the cell at frequent intervals. After one or more cleanings, the platinized surface of the electrode may have been destroyed to the extent that recalibration of the cell is necessary in order to achieve accuracy in measurement. Replatinizing is often required. In fact, manufacturers which sell the platinized electrode cells also sell replatinizing kits as adjuncts to the sale of the cells.

An additional problem in conductivity cell construction is the shunting of current from the high-voltage electrode to a stray ground rather than first passing to the other electrode.

One object of this invention is to provide a conductivity cell which continuously measures the conductivity of aqueous solutions of electrolytes and also eliminates, for all practical purposes, the adverse effects of polarization.

It has been another object of this invention to provide a conductivity cell which not only eliminates polarization effects, but also eliminates the need to platinize the surface of the electrodes used in the cell. In other words, plated but unplatinized electrodes can be used in the cell. The present cell construction also substantially decreases the amount of cleaning required.

Another principal objective of this invention is to provide for a conductivity cell which provides effective ground isolation so that the conductivity measurements are independent of ground shunting effects caused by solution retaining tank walls, piping and the like.

The present invention is predicated in part upon the concept of providing a conductivity cell including two spaced electrodes and at least one conduit including an elongated primary section of small cross sectional area providing a fluid passageway between the electrodes. The electrodes are of a substantially greater area than the cross-sectional area of the conduit, for example, by a factor of from thirty to forty times. The primary section of the conduit is of a precisely dimensioned cross section and length. The ends of the primary section of the conduit are spaced from the two electrodes and enlarged spaces are provided joining the ends of the primary section and the electrodes.

The conductivity of the water sample in the cell is determined by measuring the resistance to current flow between the electrodes. In this measurement, the resistance of the liquid in the primary section is in series with the resistance in the two enlarged fluid spaces at the ends of the conduit. Because of its configuration, i.e., small cross-sectional area and greater length, the primary section contributes by far the greatest portion of the total resistance, i.e., the resistance of the fluid in the primary section of the conduit is several orders of magnitude greater than the remaining resistance. As as result, any changes in electrode surface area due to polarization, dirt accumulation or the like, have no discernible effect on the measurement of conductivity.

More particularly, one preferred form of cell constructed in accordance with the present invention comprises an insulative cylindrical body encased in a tubular outer electrode. An inner cup-shaped electrode having its interior wall surface exposed is disposed in a cavity of the cylindrical body. In this construction, the outer electrode mounted on the outer surface of the cell shields or isolates the inner electrode from shunting or stray grounding when voltage is applied to the solution in the passage between the electrodes; thus making the measured resistance virtually independent of cell proximity to surfaces of solution retaining tank walls, piping and the like.

In one preferred form of cell embodying this invention, an elongated passageway is formed in the body between the inner and outer electrodes and defines a column of the electrolytic solution which is to be measured. The passageway has a principal section of reduced cross sectional area constituted by a bore in an insulative plug which is inserted in the cavity opening at the end of the body. The plug bore communicates with the end portion of the tubular electrode and with the exposed interior of the cup electrode.

In this embodiment, the cup electrode has a hole in its transverse wall which communicates through a T-shaped passageway in the body, on the side of the cup electrode opposite the plug, to apertures about midway along the outer electrode casing. This second passageway is of small cross-sectional area and in effect constitutes an electrical path in parallel to the path through the primary conduit section in the plug.

Among the principal advantages of this construction are that it provides an extremely effective ground shunt and eliminates polarization effects without resorting to platinized electrodes. Moreover, the construction provides for greatly enlarged electrode areas without increasing the overall size of the cell as compared to those of the prior art.

Another advantage of this cell construction is that the cell constant can be varied with precision by increasing or decreasing the plug bore diameter. This can be accomplished while maintaining the cell's dimensions, for example, by merely reaming the bore. Precision in the position of the plug bore relative to the electrodes is maintained by a cavity shoulder which seats the plug.

These and other objects and advantages of this invention will be further apparent from the following detailed description of the drawings wherein a preferred structure incorporating the principles of this invention is shown.

In the drawing:

FIG. 1 is a longitudinal cross section of a preferred conductivity cell in accordance with this invention.

FIG. 2 is a cross sectional view taken along lines 2—2 of FIG. 1.

FIG. 3 is a diagrammatic side elevational view of the lower part of the cell in FIG. 1.

One preferred form of conductivity cell 1 constructed in accordance with the principles of the present invention is shown in FIG. 1. As there shown, the conductivity cell 1 includes an insulative cylindrical body 2 which may be molded or machined from a suitable plastic, such as polyvinyl chloride. The insulative or electrically nonconductive body 2 is lightly press fitted into a tubular outer electrode casing 3 which is held in place in any suitable manner, such as by bolts 5 adjacent the shoulder end 4 of the body 2. The outer electrode casing 3 is made of a suitable unplatinized conductive material, such as copper alloy 6 plated with gold 7. This particular electrode material is especially well suited for use in monitoring salt water. It will, of course, be understood that where less corrosive water is being monitored, other electrode materials, such as Monel metal, may be employed.

The body 2 is provided with a cavity 8 in which an inner electrode cup 9 is seated. The peripheral edge 11 of the cup electrode abuts a nonconductive O-ring 12 which is positioned in a groove 13 of the interior wall of cavity 8. The outer end of the cavity wall is threaded as at 14 to receive a threaded plug 16 which is also formed from an insulative material, such as polyvinyl chloride.

The end plug 16 has a continuous central bore, or duct, 17 which provides the primary section of the conduit communicating with the cup electrode 9 and the outer tubular electrode 3. The inner nose end 18 of the plug 16 has an integral shoulder 19 which abuts the O-ring 12 positioned in the body 2. The plug also has a concentric shoulder 21 formed on its body which abuts the shoulder 22 formed in the interior wall of the cavity 8 to precisely locate bore 17 relative to the electrodes. The outer plane surface 23 of plug 16 is provided with two recesses 24 for receiving a wrench which can be employed to screw the plug into position for proper abutment with the shoulders 22 and O-ring 12 of the cavity in the main body.

It will be appreciated that primary conduit section 17 terminates in spaced relationship to both cup electrode 9 and outer electrode 3. The cross sectional area of the section 17 is substantially smaller, for example, one-thirtieth of the area of the cup electrode 9 and much smaller still than the area of outer electrode 3. The length of bore 17 greatly exceeds its diameter, e.g., by a factor of 7. This length is increased without elongating the electrode by the provision of nose 18 which extends into the cup 9. The fluid space in the cup is of much larger diameter than bore 17.

The cylindrical body 2 is also provided with a T-shaped passageway for the solution to be measured (shown best in FIG. 3), indicated generally at 30. One leg 31 of the T-shaped passageway 30 communicates with the interior 32 of cup electrode 9 by means of an opening 33 formed in the transverse wall of the cup. The passageway 31 is of substantially the same cross sectional area as opening 33 and bore 17 and also is coaxial with opening 33 and bore 17. The passageway 31 intersects duct 35 at a right angle to form the T-shaped passageway 30. Duct 35 opens at opposite ends to the cell exterior through adjacent openings, or apertures, 36 in the tubular electrode 3. The T-shaped passageway 30 thus communicates with the inner cup electrode 9 and the outer electrode 3 through apertures 33 and 36 respectively. Fluid in this passageway thus forms a parallel electrical larger diameter than bore 17.

The cell body 2 carries a rod 40 which is inserted within an elongated bore 41 from the top 42 of the cell through to the cup electrode 9 into which the end portion 43 of the rod 40 is screwed. The elongated bore 41 for the contact rod runs parallel to tubular electrode 3 and leg 31 of the T-passageway and, as shown by FIG. 2, is perpendicular to the axis of duct 35. The outer end 50 of the contact rod is threaded to receive a nut 51. A lead wire 52 is connected to the end of the contact rod by means of a conventional connector held in place by a bolt 53 engaging a tapped opening in the end 50 of the contact rod.

In use, the conductivity cell is immersed in a sample of the water being monitored. One convenient manner of doing this is to suspend the cell within a container (not shown) of larger diameter than the cell. The outer electrode 3 and the bottom wall of the plug are spaced from the walls of the container. The container is preferably provided with an inlet opening adjacent the bottom wall thereof and a discharge opening disposed a substantial distance above the inlet. Water is continuously pumped from the river, lake, or the like, into the container so that the cell is filled with a changing sample of water. It is to be understood that the water level remains above transverse bore 35 so that at all times two conductive paths are provided between the electrodes.

The first, and primary, conductive path between the electrodes is through bore 17 and plug 16. It will be appreciated that this conductive path includes not only bore 17, but also the fluid in the enlarged space between the end of nose 18 and inner electrode 9. The path also includes the fluid body between the lower end of bore 17 and the outer electrode 3. In this conductive path, the fluid in the primary section, or bore, 17 constitutes one electrical resistance in series with the resistances constituted by the fluid bodies above and below the plug. Of this total resistance, the resistance in bore 17 constitutes by far the greater portion of the resistance and is in fact greater by several orders of magnitude than the other two resistances. A second conductive path in parallel to the first extends through axial bore 31 and transverse diametral bore 35 in the body.

The conductivity of the water being monitored, or more precisely the solution of electrolyte, is determined by measuring the electrical resistance of the fluid to current flow in the presence of a carefully regulated potential. Since the dimensions of the cell are accurately determined, the conductivity of the solution is related to the measured resistance by the relationship $$C = \frac{k}{R}$$

where C represents the conductivity of the solution; R, the resistivity of the solution, and $k$, the cell constant. This cell constant is independent of the area electrodes, and is not affected by polarization or dirt accumulation, but can readily be varied by varying the bore, or principal conduit section 17. As explained above, the details of one preferred form of electrical measuring circuit for determining conductivity utilizing the present cell are disclosed in the copending patent application of Carl A. Schneider for Conductivity Measuring Circuit Utilizing Conductivity Cell as Input Resistance of an Operational Amplifier, Ser. No. 551,736, now U.S. Pat. 3,430,130, issued Feb. 25, 1969.

As shown in that application, the outer electrode 3 of the cell is connected to ground and the inner electrode is connected to a source of alternating potential. In this system the outer electrode is thus effective to provide complete ground isolation.

From the above disclosure of the general principles of the present invention, and the preceding detailed description of one preferred embodiment, those skilled in the art will readily comprehend various modifications to which the invention is susceptible. Accordingly, I desire to be limited only by the scope of the following claims.

Having described my invention I claim:

1. An electrolytic conductivity cell for measuring the conductivity of a fluid comprising an aqueous solution of electrolytes consisting of an insulative body having a cavity, a grounded outer electrode mounted on the outer surface of said body, an inner electrode disposed in said cavity and spaced from said outer electrode, said electrodes consisting of unplatinized conductive metal, said body having a conduit formed therein for establishing a fluid contact path between said electrodes, said outer electrode shielding said inner electrode from stray grounding when voltage is applied across the electrodes to said fluid in said fluid conduit path between said electrodes, said outer electrode having an exterior surface for communication with said aqueous solution, said conduit including a primary section having a cross sectional area therealong substantially less than the surface area of each of said electrodes, said primary section having a length substantially greater than its diameter, said primary section having open ends terminating in spaced relationship from each of said electrodes whereby the resistance of fluid within the primary section is substantially greater than the resistance of fluid intermediate the ends of said primary section and said respective electrodes and whereby the operation of the cell is not adversely affected by polarization of the electrode surfaces.

2. The cell of claim 1 wherein said insulative body is cylindrical, said outer electrode comprising a tubular casing mounted on the periphery of the cylinder and said inner electrode comprising a cup whose interior is in communication with said cavity.

3. The cell of claim 2 wherein an insulative plug is removably mounted in said cavity between said electrodes, said plug having an axial bore therethrough which provides said conduit primary section.

4. The cell of claim 3 wherein said conduit further includes a passageway between said inner and outer electrodes, said passageway communicating with both the interior of said cup electrode and the exterior of said tubular electrode by means of apertures respectively formed in each of said electrodes whereby a second fluid path in parallel to said first fluid path is established between said electrodes.

5. An electrolytic conductivity cell for continuously monitoring the conductivity of a fluid comprising an aqueous solution of electrolytes consisting of a cylindrical insulative body member having an open axial cavity formed therein, a grounded tubular outer electrode mounted upon the periphery of said body member, said outer electrode having an exterior surface for communication with said aqueous solution, an inner cup electrode disposed in said cavity and spaced from said outer electrode with the interior of said cup electrode in communication with said cavity, said electrodes consisting of unplatinized conductive metal, conductor means insulated from said outer electrode and providing an electrical connection between said inner electrode and the exterior of said body member, an insulating plug removably mounted in the opening of said axial cavity, said plug having an axial bore therethrough for establishing a first fluid contact path between said electrodes, said axial bore having a cross sectional area therealong substantially less than the surface area of each of said electrodes, said axial bore having a length substantially greater than its diameter, said axial bore having open ends terminating in spaced relationship from each of said electrodes, a passageway formed in said body member between said inner electrode and said outer electrode, said passageway communicating with both the interior of said cup electrode and the exterior of said outer tubular electrode by means of apertures respectively formed in each of said electrodes whereby a second fluid path in parallel to said first fluid path is established between said electrodes, said outer electrode shielding said inner electrode from stray grounding when voltage is applied across the electrodes to said fluid in said fluid conduit paths between said electrodes, whereby the resistance of fluid within said axial bore is substantially greater than the resistance of fluid intermediate the ends of said axial bore and said respective electrodes and the operation of the cell is not adversely affected by polarization of the electrode surfaces.

References Cited

UNITED STATES PATENTS

| | | | |
|---|---|---|---|
| 1,734,342 | 11/1929 | Perry | 324—30 |
| 2,221,307 | 11/1940 | Christie | 324—30 |
| 2,709,781 | 5/1955 | Douty et al. | 324—30 |
| 2,843,823 | 7/1958 | Bayless. | |
| 2,888,640 | 5/1959 | Eckfeldt et al. | 324—30 |
| 3,361,965 | 1/1968 | Coulter et al. | 324—30 X |

OTHER REFERENCES

Rosenthal, Robert: Instruments, vol. 23, No. 7, July 1950, pp. 664–666 relied on.

EDWARD E. KUBASIEWICZ, Primary Examiner